United States Patent
Chou et al.

(10) Patent No.: US 10,139,585 B1
(45) Date of Patent: Nov. 27, 2018

(54) MULTI-LENS CAMERA MODULE AND ASSEMBLING PROCESS THEREOF

(71) Applicant: Primax Electronics Ltd., Taipei (TW)

(72) Inventors: Nai-Cheng Chou, Taipei (TW); Chin-Chuan Wu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 15/671,962

(22) Filed: Aug. 8, 2017

Related U.S. Application Data

(60) Provisional application No. 62/526,657, filed on Jun. 29, 2017.

(30) Foreign Application Priority Data

Jul. 21, 2017 (TW) .............................. 106124636 A

(51) Int. Cl.
  *G02B 7/02* (2006.01)
  *H04N 5/225* (2006.01)

(52) U.S. Cl.
  CPC ............. *G02B 7/025* (2013.01); *G02B 7/021* (2013.01); *H04N 5/2252* (2013.01); *H04N 5/2254* (2013.01); *H04N 5/2257* (2013.01)

(58) Field of Classification Search
  CPC ...... G02B 7/025; G02B 7/021; H04N 5/2252; H04N 5/2254; H04N 5/2257
  See application file for complete search history.

(56) References Cited

U.S. PATENT DOCUMENTS

2017/0343763 A1\* 11/2017 Hasegawa .............. G02B 7/021
2018/0048796 A1\* 2/2018 Hsu .......................... G02B 7/09

\* cited by examiner

*Primary Examiner* — Nicholas G Giles
(74) *Attorney, Agent, or Firm* — Kirton McConkie; Evan R. Witt

(57) ABSTRACT

A processing process of a multi-lens camera module includes the following steps. Firstly, a first lens module and a first photosensitive element are installed on a first circuit board, and the first circuit board is fixed on a casing. Then, a second lens module and a second photosensitive element are installed on a second circuit board, and a bottom glue is coated on a lower portion of the second lens module. Then, the second lens module is adhered onto the casing through the bottom adhesive. After an optical axis parallel adjustment process is performed, the second lens module is in parallel with the first lens module. Then, a top glue is coated on an upper portion of the second lens module. After a baking process is performed, the top glue and the bottom glue are cured completely.

10 Claims, 10 Drawing Sheets

```
┌─────────────────────────────────────────────────┐ ─(a)
│ A casing, a first circuit board, a first photosensitive element, a first │
│ lens module, a second circuit board, a second photosensitive │
│ element and a second lens module are provided, wherein the first │
│ lens module comprises a first lens element and a first lens holder, │
│ the first lens element is supported by the first lens holder, the │
│ second lens module comprises a second lens element and a │
│ second lens holder, and the second lens element is supported by │
│ the second lens holder │
└─────────────────────────────────────────────────┘
                         ↓
┌─────────────────────────────────────────────────┐ ─(b)
│ The first photosensitive element and the first lens module are │
│ installed on the first circuit board, and the first circuit board is │
│ fixed on the casing │
│ ┌─────────────────────────────────────────────┐ ─(b1)
│ │ The first photosensitive element and the first lens module are │
│ │ subjected to six-axis active alignment, so that a first optical axis │
│ │ of the first lens module is aligned with the first photosensitive │
│ │ element, wherein the six axes of the six-axis active alignment │
│ │ include an X axis, an X rotation axis about the X axis, a Y axis, │
│ │ a Y rotation axis about the Y axis, a Z axis and a Z rotation │
│ │ axis about the Z axis │
│ └─────────────────────────────────────────────┘
└─────────────────────────────────────────────────┘
                         ↓
┌─────────────────────────────────────────────────┐ ─(c)
│ The second photosensitive element and the second lens module are │
│ installed on the second circuit board, and a bottom glue is coated on │
│ a lower connection part of the second lens holder │
│ ┌─────────────────────────────────────────────┐ ─(c1)
│ │ The second photosensitive element and the second lens module │
│ │ are subjected to six-axis active alignment, so that a second │
│ │ optical axis of the second lens module is aligned with the second │
│ │ photosensitive element, wherein the six axes of the six-axis active │
│ │ alignment include the X axis, the X rotation axis about the X axis, │
│ │ the Y axis, the Y rotation axis about the Y axis, the Z axis and the │
│ │ Z rotation axis about the Z axis │
│ └─────────────────────────────────────────────┘
└─────────────────────────────────────────────────┘
                         ↓
                        (A)

FIG.8A
```

MULTI-LENS CAMERA MODULE AND ASSEMBLING PROCESS THEREOF

CROSS-REFERENCE TO RELATED APPLICATION

This application claims priority to U.S. Provisional Patent Application No. 62/526,657 filed Jun. 29, 2017, the contents of which are incorporated herein by reference.

FIELD OF THE INVENTION

The present invention relates to a multi-lens camera module, and more particularly to a multi-lens camera module with high assembling precision.

BACKGROUND OF THE INVENTION

With increasing development of the automatic driving technology, the demands on the multi-lens camera module of the self-driving car are gradually increased. The multi-lens camera module is a camera module with two or more lens modules. In the manufacturing process, the lens modules of the camera module have to be precisely adjusted. Ideally, all lens modules of the camera module are fixed on a circuit board and oriented toward the outside at the same angle. In other words, the optical axes of all lens modules of the camera module are in parallel with each other.

However, the conventional process of assembling the multi-lens camera module still has some drawbacks. While the lens modules are installed on the circuit board, it is difficult to allow the orientations of the lens modules to be in parallel with each other because of the manual or mechanical assembling tolerance or the production tolerance of the components. That is, there are angular deviations between the lens modules. Since the optical axes of the lens modules of the conventional multi-lens camera module are not ideally in parallel with each other, the precision of using the conventional multi-lens camera module to capture the image is adversely affected. The inaccurate image denotes inaccurate information. If the inaccurate information is used in the self-driving car, the automatic driving safety is deteriorated.

In other words, the conventional multi-lens camera module and the assembling process of the multi-lens camera module need to be further improved.

SUMMARY OF THE INVENTION

The present invention provides a multi-lens camera module with a first image pickup module and a second image pickup module. The second image pickup module is adjusted according to the first image pickup module. Consequently, a second optical axis of the second image pickup module is adjusted to be in parallel with a first optical axis of the first image pickup module, and the imaging precision is enhanced.

In accordance with an aspect of the present invention, there is provided an assembling process of a multi-lens camera module. The assembling process includes the following steps. In a step (a), a casing, a first circuit board, a first photosensitive element, a first lens module, a second circuit board, a second photosensitive element and a second lens module are provided. The first lens module includes a first lens element and a first lens holder. The first lens element is supported by the first lens holder. The second lens module includes a second lens element and a second lens holder. The second lens element is supported by the second lens holder. In a step (b), the first photosensitive element and the first lens module are installed on the first circuit board, and the first circuit board is fixed on the casing. In a step (c), the second photosensitive element and the second lens module are installed on the second circuit board, and a bottom glue is coated on a lower connection part of the second lens holder. In a step (d), the second lens module is penetrated through a receiving opening of the casing, and the lower connection part of the second lens holder is adhered onto the casing through the bottom glue. In a step (e), an optical axis parallel adjustment process is performed. Consequently, a second optical axis of the second lens element is adjusted to be in parallel with a first optical axis of the first lens element. In a step (f), a top glue is coated on an upper connection part of the second lens holder. Consequently, the upper connection part of the second lens holder is adhered onto the casing through the top glue. In a step (g), the top glue is pre-cured. Consequently, the second lens module is adhered onto the casing through a pre-cured bonding strength of the top glue. The second optical axis is continuously in parallel with the first optical axis. In a step (h), the multi-lens camera module is baked. Consequently, the top glue and the bottom glue are completely cured.

In an embodiment, the assembling process further includes step (g1') and (g2') after the step (g). In the step (g1'), an uncured circuit board glue is coated on a junction between the second circuit board and the casing, and at least one fastening element is penetrated through the uncured circuit board glue, the second circuit board and the casing. The uncured circuit board glue is arranged between a head part of the fastening element and the second circuit board. In the step (g2'), the optical axis parallel adjustment process again is performed, and the at least one fastening element is tightened into the casing. While the at least one fastening element is tightened into the casing, the head part of the fastening element compresses the uncured circuit board glue so as to push and adjust the second circuit board, and the second optical axis is adjusted to be in parallel with the first optical axis.

In an embodiment, the assembling process further includes a step (i) of checking whether the first optical axis is in parallel with the second optical axis.

In an embodiment, each of the uncured circuit board glue, the top glue and the bottom glue is a UV curable and thermoset glue.

In an embodiment, the step (b) further includes a step (b1) of performing six-axis active alignment on the first photosensitive element and the first lens module, so that the first optical axis is aligned with the first photosensitive element. The six axes of the six-axis active alignment include an X axis, an X rotation axis about the X axis, a Y axis, a Y rotation axis about the Y axis, a Z axis and a Z rotation axis about the Z axis.

In an embodiment, the step (c) further includes a step (c1) of performing six-axis active alignment on the second photosensitive element and the second lens module, so that the second optical axis is aligned with the second photosensitive element. The six axes of the six-axis active alignment include an X axis, an X rotation axis about the X axis, a Y axis, a Y rotation axis about the Y axis, a Z axis and a Z rotation axis about the Z axis.

In an embodiment, the step (g) further includes a step (g0) of irradiating an UV light onto the top glue so as to pre-cure the top glue.

In accordance with another aspect of the present invention, there is provided a multi-lens camera module. The multi-lens camera module includes a casing, a first circuit board, a first photosensitive element, a first lens module, a second circuit board, a second photosensitive element and a second lens module. The first circuit board is fixed on the casing and accommodated within the casing. The first photosensitive element is installed on a top surface of the first circuit board. The first lens module is fixed on the top surface of the first circuit board and aligned with a top side of the first photosensitive element. The first lens module includes a first lens element and a first lens holder. The first lens element is supported by the first lens holder. The first lens element has a first optical axis. The second circuit board is fixed on the casing and accommodated within the casing. The second photosensitive element is installed on a top surface of the second circuit board. The second lens module is fixed on the top surface of the second circuit board and aligned with a top side of the second photosensitive element. The second lens module includes a second lens element and a second lens holder. The second lens element is supported by the second lens holder. The second lens element has a second optical axis. The second optical axis of the second lens element is in parallel with the first optical axis of the first lens element. The second lens holder is penetrated through a receiving opening of the casing. A lower connection part of the second lens holder is located below the receiving opening and adhered onto the casing through a bottom glue. An upper connection part of the second lens holder is located above the receiving opening and adhered onto the casing through a top glue.

In an embodiment, the multi-lens camera module further includes at least one fastening element and a circuit board glue, and the fastening element includes a head part and a body part connected with the head part. The body part is penetrated through the second circuit board and the casing. The circuit board glue is arranged between the head part and the second circuit board. After the circuit board glue is cured, the at least fastening element, the second circuit board and the casing are combined together through the circuit board glue.

In an embodiment, the second lens holder includes a locking wing part, and the second lens holder is penetrated through the receiving opening of the casing. The locking wing part is externally extended from an outer periphery of the second lens holder. The locking wing part and the bottom glue are locked on the receiving opening of the casing.

The above objects and advantages of the present invention will become more readily apparent to those ordinarily skilled in the art after reviewing the following detailed description and accompanying drawings, in which:

BRIEF DESCRIPTION OF THE DRAWINGS

FIGS. 8A, 8B and 8C illustrate a flowchart of an assembling process of a multi-lens camera module according to an embodiment of the present invention.

DETAILED DESCRIPTION OF THE PREFERRED EMBODIMENT

Figure 5:
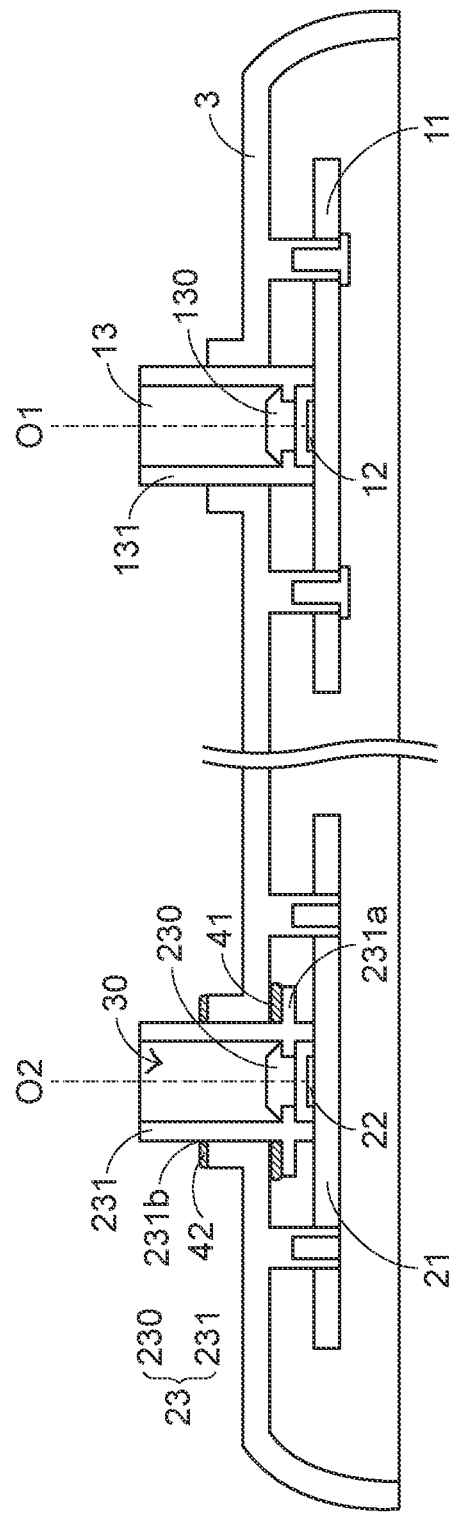
FIG. 5 is a schematic cross-sectional view illustrating associated components of the multi-lens camera module according to the embodiment of the present invention, in which the second lens module and the second circuit board are assembled with the casing and an upper connection part of the second lens holder of the second lens module is coated with a top glue.
Figure 8B:
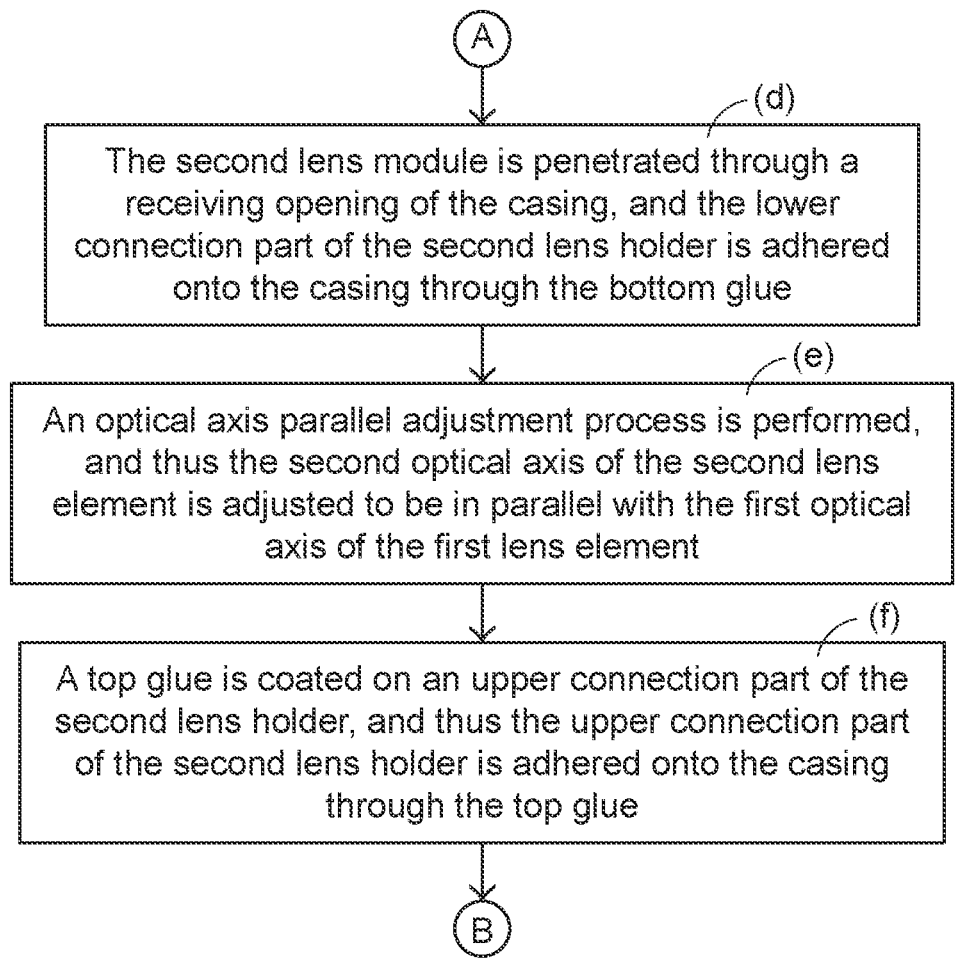
Figure 8C:
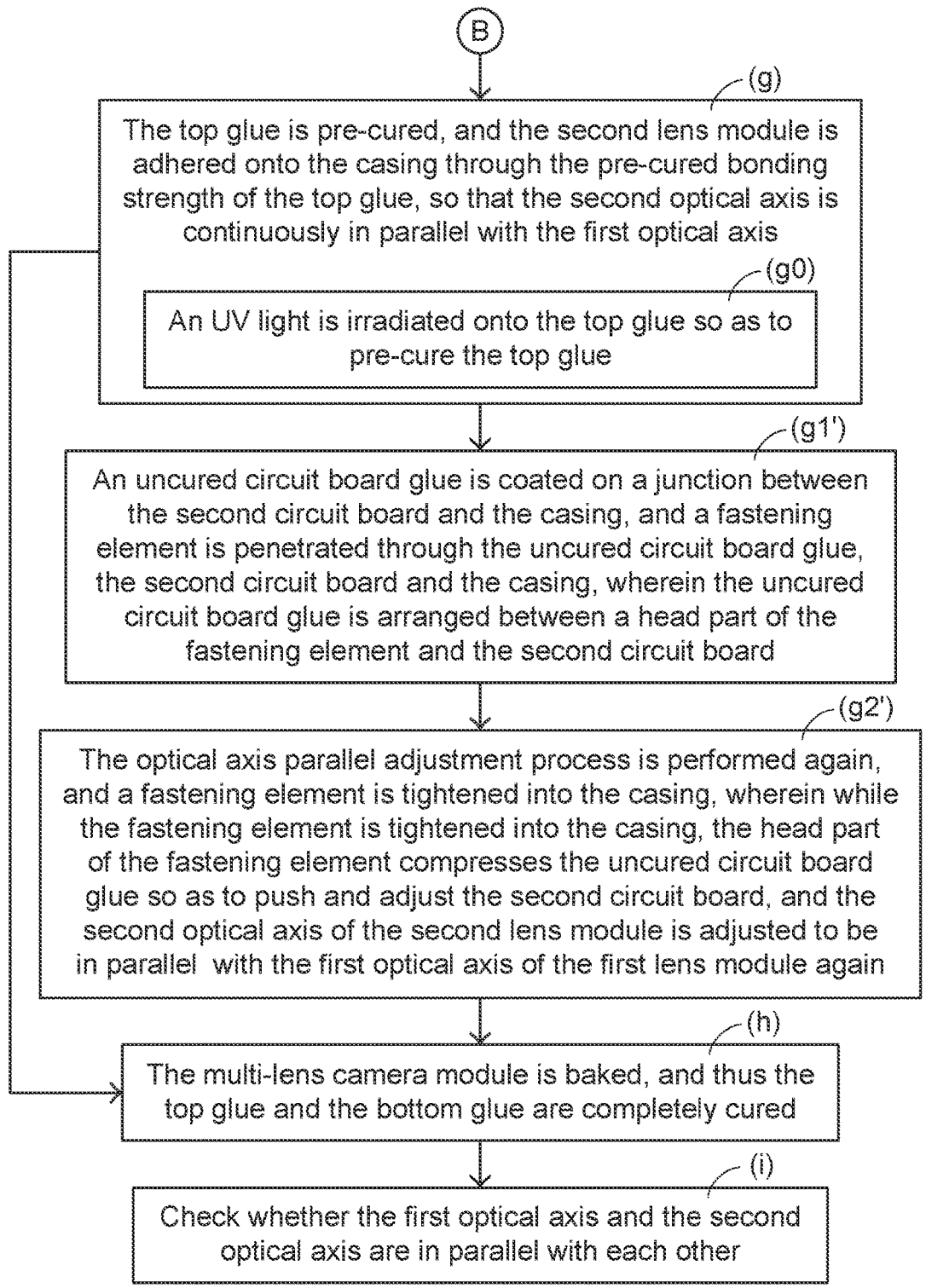

The present invention provides an assembling process of a multi-lens camera module. FIGS. 8A, 8B and 8C illustrate a flowchart of an assembling process of a multi-lens camera module according to an embodiment of the present invention. Firstly, in a step (a), the basic components of the multi-lens camera module 100 are provided. The multi-lens camera module 100 comprises a casing 3, a first circuit board 11, a first photosensitive element 12, a first lens module 13, a second circuit board 21, a second photosensitive element 22 and a second lens module 23. The first lens module 13 comprises a first lens element 130 and a first lens holder 131. The first lens element 130 is supported by the first lens holder 131. The second lens module 23 comprises a second lens element 230 and a second lens holder 231. The second lens element 230 is supported by the second lens holder 231. In an embodiment, the first photosensitive element 12 and the second photosensitive element 22 are complementary metal-oxide semiconductor (CMOS) sensors. After the above basic components are assembled, the multi-lens camera module 100 is produced. The relative positions between the basic components of the multi-lens camera module 100 are shown in FIG. 5.

Figure 1:
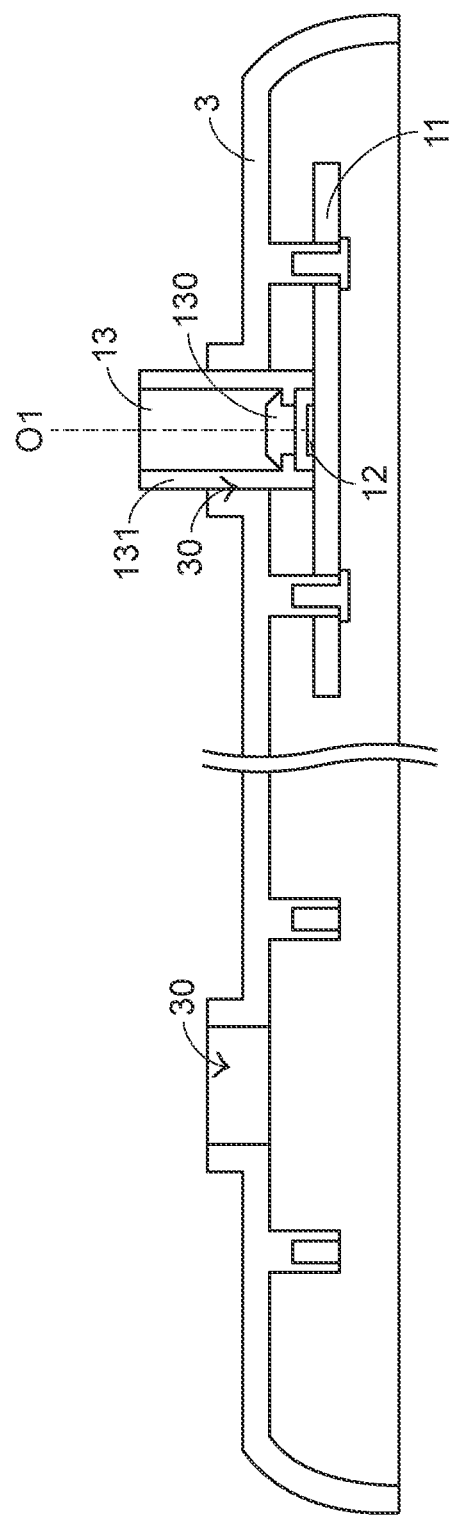
FIG. 1 is a schematic cross-sectional view illustrating the relationships between a first lens module, a first circuit board and a casing of a multi-lens camera module according to an embodiment of the present invention.

FIG. 1 is a schematic cross-sectional view illustrating the relationships between a first lens module, a first circuit board and a casing of a multi-lens camera module according to an embodiment of the present invention. After the basic components are provided in the step (a), a step (b) is performed. In the step (b), the first photosensitive element 12 and the first lens module 13 are installed on the first circuit board 11, and the first circuit board 11 is fixed on the casing 3. After the first photosensitive element 12 is installed on the first circuit board 11, a step (b1) is performed. That is, the first photosensitive element 12 and the first lens module 13 are subjected to six-axis active alignment (AA). Consequently, the first lens element 130 is located over the first photosensitive element 12, and a first optical axis O1 of the first lens element 130 is aligned with the first photosensitive element 12. After the active alignment is completed, the first lens module 13 is fixed on the first circuit board 11.

After the alignment between the first lens module 13 and the first photosensitive element 12 is completed and the first lens module 13 and the first photosensitive element 12 are fixed on the first circuit board 11, the first circuit board 11 is connected with the casing 3 through a screwing means or an adhering means. In an embodiment, the first circuit board 11 is connected with the casing 3, and the first lens module 13 is penetrated through a receiving opening 30 of the casing 3. Meanwhile, the first circuit board 11 is contacted with the casing 3.

In this context, the term "six-axis active alignment" used herein indicates a process of adjusting the parameter of each axis of the six axes. By the six-axis active alignment, the center of the first lens module 13 is aligned with the center of the first photosensitive element 12, and the first optical axis O1 of the first lens element 130 is perpendicular to the first photosensitive element 12. The ambient light is introduced into the first lens module 13 from the surroundings. After the ambient light passes through the first lens element 130, the ambient light is accurately projected on the first photosensitive element 12 so as to obtain a sharp image. Moreover, the six axes include three perpendicular axes (i.e., an X axis, a Y axis and a Z axis), an X rotation axis about the X axis, a Y rotation axis about the Y axis, and a Z rotation axis about the Z axis.

After the first lens module 13, the first photosensitive element 12 and the first circuit board 11 are assembled with the casing 3, there is a specified included angle between the first optical axis O1 of the first lens element 130 and the casing 3. Due to the assembling tolerances of the first lens module 13, the first photosensitive element 12 and the first circuit board 11, the specified included angle between the first optical axis O1 of the first lens element 130 and the casing 3 is usually not the ideal angle (i.e., 90 degrees). By using the subsequent assembling steps, the influence of the deviation of the specified included angle between the first optical axis O1 of the first lens element 130 and the casing 3 can be neglected. Consequently, a second optical axis O2 of the second lens module 23 can be adjusted to be in parallel with or nearly parallel with the first optical axis O1 of the first lens element 130.

Figure 2:
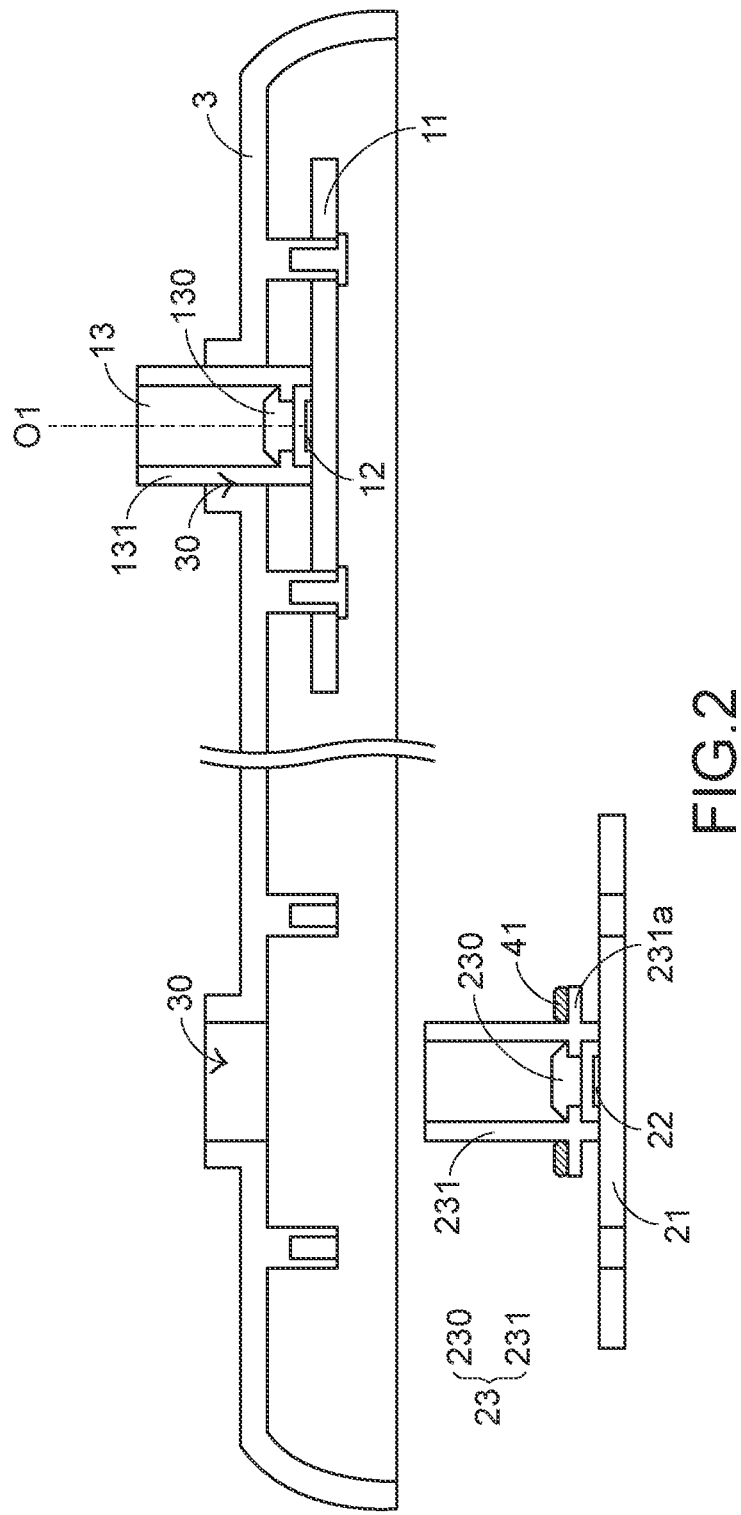
FIG. 2 is a schematic cross-sectional view illustrating associated components of the multi-lens camera module according to the embodiment of the present invention, in which the second lens module and the second circuit board are not assembled with the casing and a lower connection part of the second lens holder of the second lens module is coated with a bottom glue.

Then, a step (c) is performed. Please also refer to FIG. 2. FIG. 2 is a schematic cross-sectional view illustrating associated components of the multi-lens camera module according to the embodiment of the present invention, in which the second lens module and the second circuit board are not assembled with the casing and a lower connection part of the second lens holder of the second lens module is coated with a bottom glue. In the step (c), the second photosensitive element 22 and the second lens module 23 are installed on the second circuit board 21, and a bottom glue 41 is coated on a lower connection part 231a of the second lens holder 231. After the second photosensitive element 22 is installed on the second circuit board 21, a step (c1) is performed. That is, the second photosensitive element 22 and the second lens module 213 are subjected to six-axis active alignment (AA). Consequently, the second lens element 230 is located over the second photosensitive element 22, and a second optical axis O2 of the second lens element 230 is aligned with the second photosensitive element 22. After the active alignment is completed, the second lens module 23 is fixed on the second circuit board 21. Under this circumstance, the second lens element 230 and the second photosensitive element 22 are aligned with each other, and the second lens module 23 and the second photosensitive element 22 are installed on the second circuit board 21. Then, the bottom glue 41 is coated on the lower connection part 231a of the second lens holder 231. Consequently, in the subsequent step (d), the lower connection part 231a is connected with the casing 3 through the bottom glue 41. In an embodiment, the lower connection part 231a is a locking wing part that is externally extended from an outer periphery of the second lens holder 231. Consequently, the lower connection part 231a and the bottom glue 41 are locked on a receiving opening 30 of the casing 3.

Figure 3:
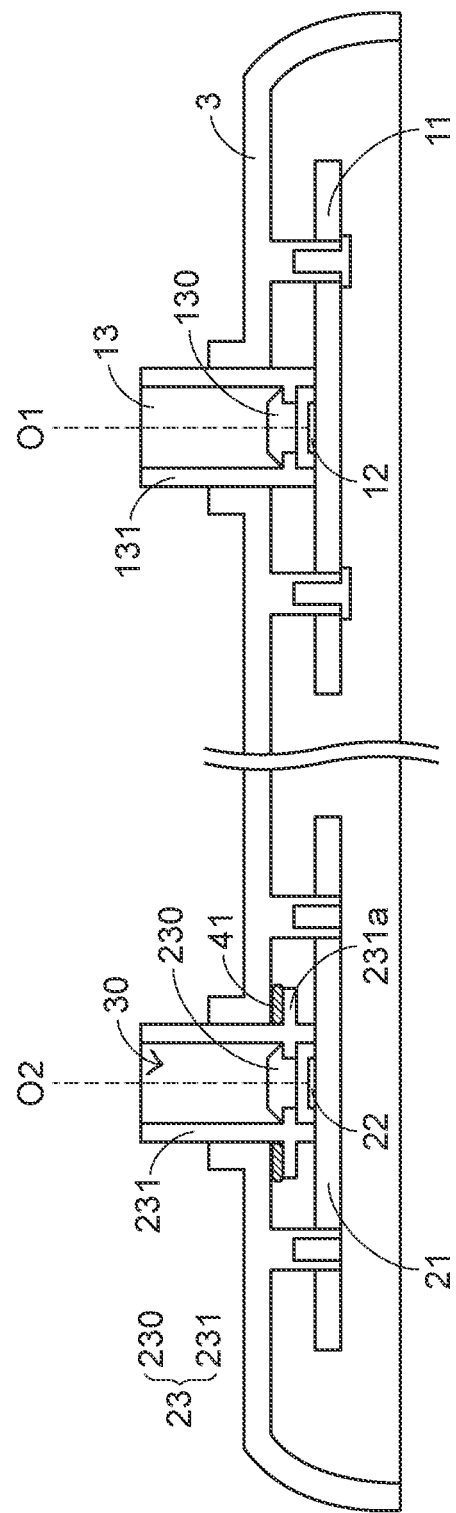
FIG. 3 is a schematic cross-sectional view illustrating the relationships between the second lens module, the second circuit board and the casing of the multi-lens camera module according to the embodiment of the present invention.

FIG. 3 is a schematic cross-sectional view illustrating the relationships between the second lens module, the second circuit board and the casing of the multi-lens camera module according to the embodiment of the present invention. Then, a step (d) is performed. In the step (d), the second lens module 23 is penetrated through the receiving opening 30 of the casing 3, and the lower connection part 231a of the second lens holder 231 is adhered onto the casing 3 through the bottom glue 41. That is, an upper portion of the second lens holder 231 is partially protruded out of the casing 3 and exposed outside, and a lower portion of the second lens holder 231 is partially disposed within the casing 3.

For allowing the second lens module 23 to be in parallel with the first lens module 13, an optical axis parallel adjustment process is performed. In a step (e), the second optical axis O2 of the second lens element 230 is adjusted to be in parallel with the first optical axis O1 of the first lens element 130. The optical axis parallel adjustment process will be described in more details with reference to FIG. 4.

Figure 4:
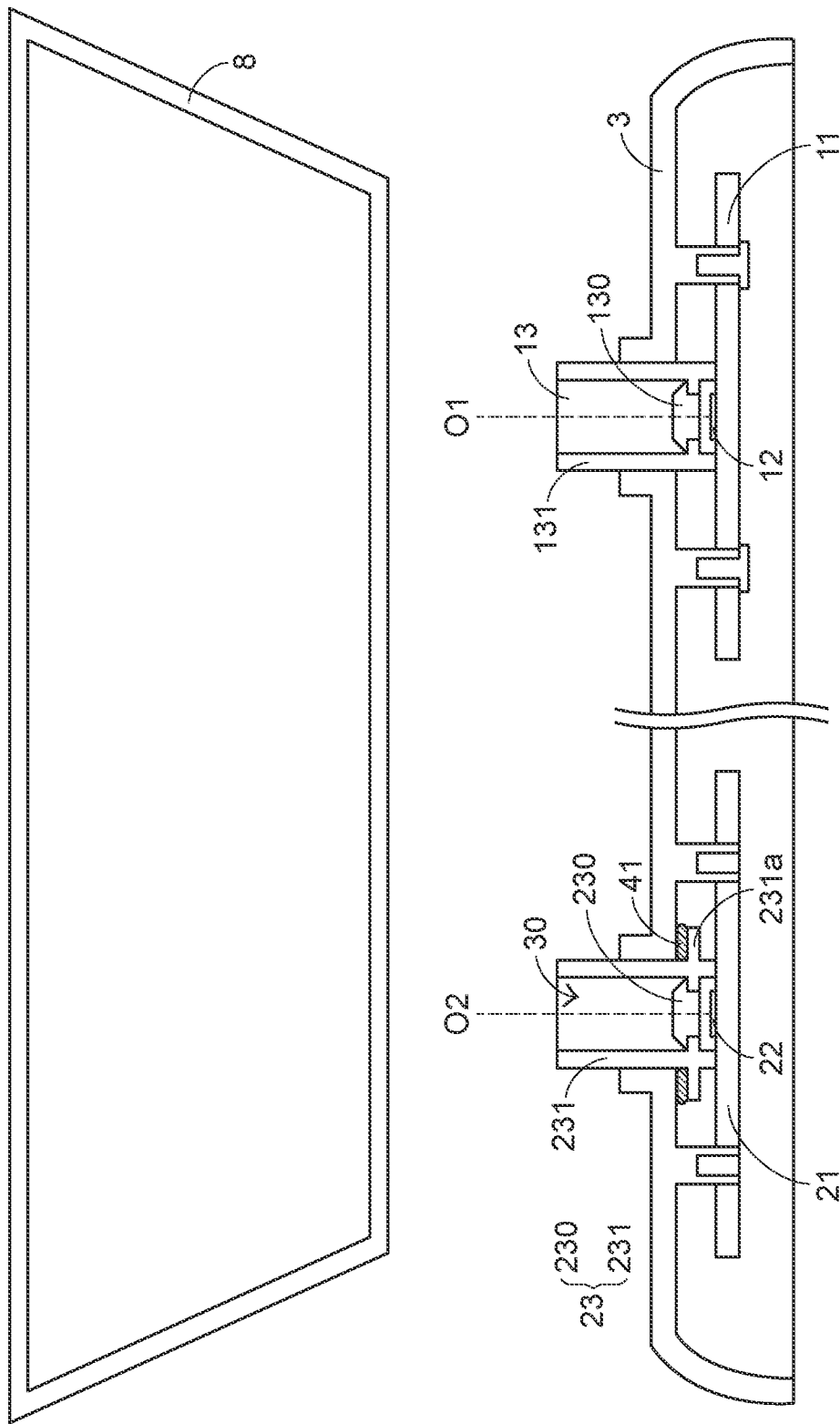
FIG. 4 schematically illustrates the relationships between the first lens module, the first photosensitive element, the second lens module and the second photosensitive element of the multi-lens camera module during the optical axis parallel adjustment process.

FIG. 4 schematically illustrates the relationships between the first lens module, the first photosensitive element, the second lens module and the second photosensitive element of the multi-lens camera module during the optical axis parallel adjustment process. For illustration, the first lens module 13 and the first photosensitive element 12 are collaboratively defined as a first image pickup module, and the second lens module 23 and the second photosensitive element 22 are collaboratively defined as a second image pickup module. The optical axis parallel adjustment process comprises the following steps. Firstly, the first image pickup module shoots a screen 8 (or a scene) to acquire a fixed fiducial image, and the second image pickup module shoots the same screen 8 to acquire an adjusted image. Moreover, the second image pickup module is subjected to the six-axis active alignment. By adjusting the parameter of each axis of the six axes corresponding to the second image pickup module, the adjusted image matches the fixed fiducial image. Then, a soft computation is executed to confirm whether the first optical axis O1 of the first image pickup module and the second optical axis O2 of the second image pickup module are in parallel with each other completely. Alternatively, the soft computation is executed to confirm whether the first optical axis O1 of the first image pickup module and the second optical axis O2 of the second image pickup module are in nearly parallel with each other. The allowable range may be determined according to the practical production line.

After the step (e) is performed, the second optical axis O2 is continuously in parallel with the first optical axis O1. Then, a step (f) is performed. Please also refer to FIG. 5. A top glue 42 is coated on an upper connection part 231b of the second lens holder 231. Consequently, the upper connection part 231b of the second lens holder 231 is adhered onto the casing 3 through the top glue 42. In the second lens holder 231, the upper connection part 231b is at a level higher than the lower connection part 231a. The top glue 42 is located at the outside of the casing 3 through the upper connection part 231b of the second lens holder 231. The bottom glue 41 is located at the inside of the casing 3 through the lower connection part 231a of the second lens holder 231. When heat energy and force are applied to the top glue 42 and the bottom glue 41, the adhesive forces provided by the top glue 42 and the bottom glue 41 are balanced in in opposite directions. Consequently, the fixing strength and the product reliability are increased.

Then, a step (g) is performed. In the step (g), the top glue 42 is pre-cured. Moreover, the second lens module 23 is adhered onto the casing 3 through the pre-cured bonding strength of the top glue 42. Consequently, the second optical axis O2 is continuously in parallel with the first optical axis O1. The pre-curing step (g) comprises a step (g0) of irradiating an UV light onto the top glue 42 to pre-cure the top glue 42. After the top glue 42 is pre-cured, the top glue 42 is slightly solidified. Under this circumstance, the flow property of the top glue 42 decreases, but the top glue 42 is still deformable.

Figure 6:
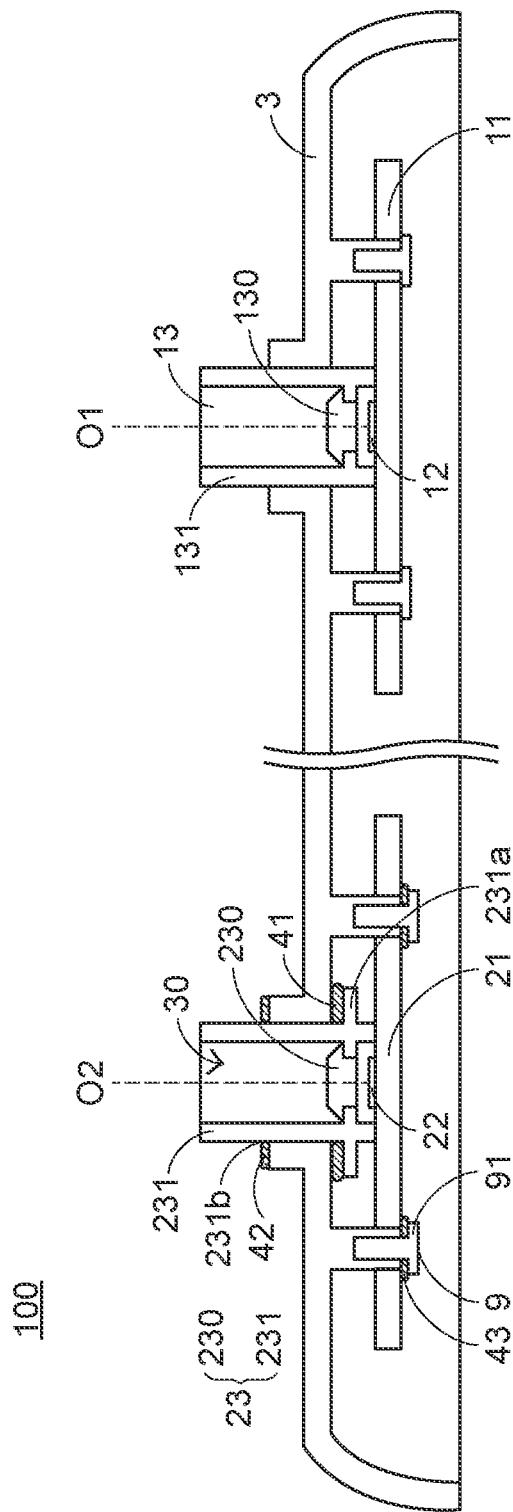
FIG. 6 is a schematic cross-sectional view illustrating associated components of the multi-lens camera module according to the embodiment of the present invention, in which the junction between the second circuit board and the casing is coated with an uncured circuit board glue and a fastening element is penetrated through the uncured circuit board glue.

For enhancing the structural strength between the second circuit board 21 and the casing 3, a step (g1') and a step (g2') are performed after the step (g). FIG. 6 is a schematic cross-sectional view illustrating associated components of the multi-lens camera module according to the embodiment of the present invention, in which the junction between the second circuit board and the casing is coated with an uncured circuit board glue and a fastening element is penetrated through the uncured circuit board glue. In the step (g1'), the uncured circuit board glue 43 is coated on a junction between the second circuit board 21 and the casing 3, and a body part 92 of the fastening element 9 is penetrated through the uncured circuit board glue 43, the second circuit board 21 and the casing 3. The uncured circuit board glue 43 is arranged between a head part 91 of the fastening element 9 and the second circuit board 21. In the step (g2'), the optical axis parallel adjustment process is performed again. Then, the fastening element 9 is tightened into the casing 3. While the fastening element 9 is tightened into the casing 3, the head part 91 of the fastening element 9 compresses the uncured circuit board glue 43 so as to push and adjust the second circuit board 21. In such way, the second optical axis O2 of the second lens module 23 is adjusted to be in parallel with the first optical axis O1 of the first lens module 13 again. Preferably, each of the uncured circuit board glue 43, the top glue 42 and the bottom glue 41 is a UV curable and thermoset glue.

Then, a step (h) and a step (i) are performed. In the step (h), the multi-lens camera module 100 is sent into an oven. After the oven is activated, the top glue 42, the bottom glue 41 and the uncured circuit board glue 43 are completely cured. Since the structural strength of the multi-lens camera module 100 is enhanced, the adjustment is more reliable. After the step (h), the step (i) is performed to check whether the first optical axis O1 and the second optical axis O2 are in parallel with each other.

Figure 7:
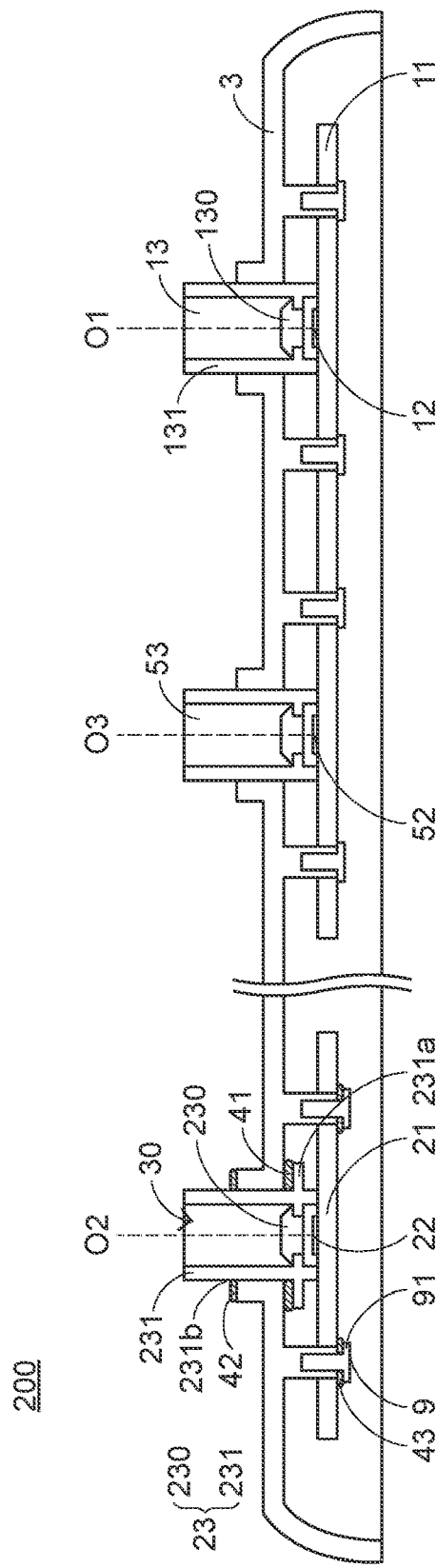
FIG. 7 is a schematic cross-sectional view illustrating a multi-lens camera module according to another embodiment of the present invention.

FIG. 7 is a schematic cross-sectional view illustrating a multi-lens camera module according to another embodiment of the present invention. Like the above embodiment, the multi-lens camera module 200 of this embodiment comprises a casing 3, a first circuit board 11, a first photosensitive element 12, a first lens module 13, a second circuit board 21, a second photosensitive element 22 and a second lens module 23. The first lens module 13 comprises a first lens element 130 and a first lens holder 131. The first lens element 130 is supported by the first lens holder 131. The second lens module 23 comprises a second lens element 230 and a second lens holder 231. The second lens element 230 is supported by the second lens holder 231. In comparison with the above embodiment, the multi-lens camera module 200 of this embodiment further comprises a third photosensitive element 52 and a third lens module 53. The third photosensitive element 52 and the third lens module 53 are installed on the first circuit board 11. That is, the photosensitive element 52 and the third lens module 53, the first photosensitive element 12 and the first lens module 13 are all installed on the first circuit board 11. Moreover, a first optical axis O1, a second optical axis O2 and a third optical axis O3 are in parallel with each other. The first lens module 13 is a standard main focal lens module, the second lens module 23 is a wide-angle focal lens module, and the third lens module 53 is a telephoto focal lens module.

From the above descriptions, the present invention provides an assembling process of a multi-lens camera module with a first image pickup module and a second image pickup module. The second image pickup module is adjusted according to the first image pickup module. Consequently, a second optical axis of the second image pickup module is adjusted to be in parallel with a first optical axis of the first image pickup module. After the adjustment is completed, a second lens holder is fixed on a casing through a top glue and a bottom glue. When a force or a temperature change is applied to the multi-lens camera module, the adhesive forces provided by the top glue 42 and the bottom glue 41 are balanced in in opposite directions. Consequently, the fixing strength and the product reliability are obviously increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An assembling process of a multi-lens camera module, the assembling process comprising steps of:
   (a) providing a casing, a first circuit board, a first photosensitive element, a first lens module, a second circuit board, a second photosensitive element and a second lens module, wherein the first lens module comprises a first lens element and a first lens holder, the first lens element is supported by the first lens holder, the second lens module comprises a second lens element and a second lens holder, and the second lens element is supported by the second lens holder;
   (b) installing the first photosensitive element and the first lens module on the first circuit board, and fixing the first circuit board on the casing;
   (c) installing the second photosensitive element and the second lens module on the second circuit board, and coating a bottom glue on a lower connection part of the second lens holder;
   (d) penetrating the second lens module through a receiving opening of the casing, and adhering the lower connection part of the second lens holder onto the casing through the bottom glue;
   (e) performing an optical axis parallel adjustment process, so that a second optical axis of the second lens element is adjusted to be in parallel with a first optical axis of the first lens element;

(f) coating a top glue on an upper connection part of the second lens holder, so that the upper connection part of the second lens holder is adhered onto the casing through the top glue;

(g) pre-curing the top glue, so that the second lens module is adhered onto the casing through a pre-cured bonding strength of the top glue, wherein the second optical axis is continuously in parallel with the first optical axis; and (h) baking the multi-lens camera module, so that the top glue and the bottom glue are completely cured.

2. The assembling process according to claim 1, wherein after the step (g), the assembling process further comprises steps of:

(g1') coating an uncured circuit board glue on a junction between the second circuit board and the casing, and penetrating at least one fastening element through the uncured circuit board glue, the second circuit board and the casing, wherein the uncured circuit board glue is arranged between a head part of the fastening element and the second circuit board; and (g2') performing the optical axis parallel adjustment process again, and tightening the at least one fastening element into the casing, wherein while the at least one fastening element is tightened into the casing, the head part of the fastening element compresses the uncured circuit board glue so as to push and adjust the second circuit board, and the second optical axis is adjusted to be in parallel with the first optical axis.

3. The assembling process according to claim 2, further comprising a step (i) of checking whether the first optical axis is in parallel with the second optical axis.

4. The assembling process according to claim 2, wherein each of the uncured circuit board glue, the top glue and the bottom glue is a UV curable and thermoset glue.

5. The assembling process according to claim 1, wherein the step (b) further comprises a step (b1) of performing six-axis active alignment on the first photosensitive element and the first lens module, so that the first optical axis is aligned with the first photosensitive element, wherein six axes of the six-axis active alignment include an X axis, an X rotation axis about the X axis, a Y axis, a Y rotation axis about the Y axis, a Z axis and a Z rotation axis about the Z axis.

6. The assembling process according to claim 1, wherein the step (c) further comprises a step (c1) of performing six-axis active alignment on the second photosensitive element and the second lens module, so that the second optical axis is aligned with the second photosensitive element, wherein six axes of the six-axis active alignment include an X axis, an X rotation axis about the X axis, a Y axis, a Y rotation axis about the Y axis, a Z axis and a Z rotation axis about the Z axis.

7. The assembling process according to claim 1, wherein the step (g) further comprises a step (g0) of irradiating an UV light onto the top glue so as to pre-cure the top glue.

8. A multi-lens camera module, comprising:

a casing;

a first circuit board fixed on the casing and accommodated within the casing;

a first photosensitive element installed on a top surface of the first circuit board;

a first lens module fixed on the top surface of the first circuit board and aligned with a top side of the first photosensitive element, wherein the first lens module comprises a first lens element and a first lens holder, the first lens element is supported by the first lens holder, and the first lens element has a first optical axis;

a second circuit board fixed on the casing and accommodated within the casing;

a second photosensitive element installed on a top surface of the second circuit board; and a second lens module fixed on the top surface of the second circuit board and aligned with a top side of the second photosensitive element, wherein the second lens module comprises a second lens element and a second lens holder, the second lens element is supported by the second lens holder, and the second lens element has a second optical axis, wherein the second optical axis of the second lens element is in parallel with the first optical axis of the first lens element, wherein the second lens holder is penetrated through a receiving opening of the casing, a lower connection part of the second lens holder is located below the receiving opening and adhered onto the casing through a bottom glue, and an upper connection part of the second lens holder is located above the receiving opening and adhered onto the casing through a top glue.

9. The multi-lens camera module according to claim 8, wherein the multi-lens camera module further comprises at least one fastening element and a circuit board glue, and the fastening element comprises a head part and a body part connected with the head part, wherein the body part is penetrated through the second circuit board and the casing, and the circuit board glue is arranged between the head part and the second circuit board, wherein after the circuit board glue is cured, the at least fastening element, the second circuit board and the casing are combined together through the circuit board glue.

10. The multi-lens camera module according to claim 8, wherein the second lens holder comprises a locking wing part, and the second lens holder is penetrated through the receiving opening of the casing, wherein the locking wing part is externally extended from an outer periphery of the second lens holder, and the locking wing part and the bottom glue are locked on the receiving opening of the casing.

* * * * *